US012650751B2

(12) United States Patent
Huang et al.

(10) Patent No.: US 12,650,751 B2
(45) Date of Patent: Jun. 9, 2026

(54) TOUCH MODULE

(71) Applicant: Primax Electronics Ltd., Taipei (TW)

(72) Inventors: Wei-Chiang Huang, Taipei (TW); Wei-Ping Chan, Taipei (TW); Tse-Ping Kuan, Taipei (TW); Sian-Yi Chiu, Taipei (TW); Chih-Wei Huang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 19/092,562

(22) Filed: Mar. 27, 2025

(65) Prior Publication Data

US 2025/0362778 A1 Nov. 27, 2025

(30) Foreign Application Priority Data

May 23, 2024 (TW) ................................. 113119085

(51) Int. Cl.
*G06F 3/044* (2006.01)
(52) U.S. Cl.
CPC .................................. *G06F 3/0447* (2019.05)
(58) Field of Classification Search
CPC ..................... G06F 3/0447; G06F 2203/04105
See application file for complete search history.

(56) References Cited

U.S. PATENT DOCUMENTS

| | | | | |
|---|---|---|---|---|
| 10,871,867 B1 * | 12/2020 | Banss | .................... | G06F 3/0447 |
| 11,640,215 B1 * | 5/2023 | Huang | .................... | G06F 1/169 |
| | | | | 345/173 |
| 11,726,584 B1 * | 8/2023 | Huang | .................... | G06F 1/169 |
| | | | | 345/157 |
| 11,726,597 B1 * | 8/2023 | Peretz | .................... | G06F 3/0443 |
| | | | | 345/173 |
| 11,899,857 B1 * | 2/2024 | Huang | .................... | G06F 1/169 |
| 11,966,530 B1 * | 4/2024 | Huang | .................... | G06F 3/0414 |
| 12,229,378 B1 * | 2/2025 | Barel | .................... | G06F 3/03547 |
| 2002/0149571 A1 * | 10/2002 | Roberts | .................... | G06F 3/04142 |
| | | | | 345/173 |
| 2008/0202824 A1 * | 8/2008 | Philipp | .................... | G06F 3/0338 |
| | | | | 178/18.01 |
| 2009/0128501 A1 * | 5/2009 | Lazaridis | .................... | G06F 3/0416 |
| | | | | 345/173 |
| 2011/0018816 A1 * | 1/2011 | Liu | .................... | G06F 1/169 |
| | | | | 345/173 |

(Continued)

*Primary Examiner* — Vinh T Lam
(74) *Attorney, Agent, or Firm* — KIRTON McCONKIE; Evan R. Witt

(57) ABSTRACT

A touch module includes a base plate, a touch plate, an elastic structure and a pressure sensor. The elastic structure includes an elastic element. The pressure sensor includes a sensing element and a sensing part. The touch panel is located over the base plate. The elastic element of the elastic structure is disposed on the base plate and covered by the touch plate. The pressure sensor is arranged between the base plate and the touch plate. The sensing element of the pressure sensor is installed on the touch plate and aligned with the elastic element. The sensing part is disposed on the base plate and located at the periphery of the elastic element. When the touch plate is pressed, the elastic element is moved, and a distance between the sensing element and the sensing part is subjected to a change. Consequently, an electric signal is generated.

13 Claims, 7 Drawing Sheets

(56)  References Cited

U.S. PATENT DOCUMENTS

| | | | |
|---|---|---|---|
| 2011/0254786 A1* | 10/2011 | Wen | G06F 1/1616 |
| | | | 345/173 |
| 2013/0207927 A1* | 8/2013 | Pfau | G06F 3/016 |
| | | | 345/173 |
| 2014/0190814 A1* | 7/2014 | Wu | G06F 3/03547 |
| | | | 200/600 |
| 2016/0098109 A1* | 4/2016 | Choi | G06F 3/0443 |
| | | | 345/174 |
| 2016/0224168 A1* | 8/2016 | Watanabe | G06F 3/0445 |
| 2017/0285803 A1* | 10/2017 | Lee | G06F 3/0447 |
| 2017/0351358 A1* | 12/2017 | Matsumoto | G06F 3/0412 |
| 2018/0046305 A1* | 2/2018 | Kang | H04M 1/0266 |
| 2018/0081480 A1* | 3/2018 | Ran | G06F 3/0426 |
| 2018/0143718 A1* | 5/2018 | Kim | G06F 3/0447 |
| 2019/0004651 A1* | 1/2019 | Hong | G06F 3/0416 |
| 2019/0040906 A1* | 2/2019 | Buckingham | H01H 13/12 |
| 2019/0073077 A1* | 3/2019 | Kim | G06F 3/0445 |
| 2019/0235661 A1* | 8/2019 | Zhang | G06F 3/0446 |
| 2019/0243485 A1* | 8/2019 | Choi | G06F 3/0416 |
| 2020/0301471 A1* | 9/2020 | Huang | G06F 3/03547 |
| 2020/0371659 A1* | 11/2020 | Kim | G06F 3/04142 |
| 2021/0278966 A1* | 9/2021 | Rosenberg | G06F 3/016 |
| 2022/0147222 A1* | 5/2022 | Chen | G06F 3/043 |
| 2023/0070324 A1* | 3/2023 | Ito | B60K 35/10 |
| 2023/0315214 A1* | 10/2023 | Lochun | G06F 1/169 |
| | | | 345/168 |
| 2023/0324995 A1* | 10/2023 | Rosenberg | G06F 1/169 |
| 2023/0341939 A1* | 10/2023 | Jin | G06F 3/04142 |
| 2023/0341980 A1* | 10/2023 | Liu | G06F 3/041 |

* cited by examiner

TOUCH MODULE

FIELD OF THE INVENTION

The present invention relates to a touch-sensitive input device, and more particularly to a touch module.

BACKGROUND OF THE INVENTION

A conventional touch module is usually equipped with an inductive pressure sensor. The inductive pressure sensor is used to detect the pressure applied on the touch module by the user. In addition, the inductive pressure sensor generates a pressure signal according to the applied pressure.

The principles of the inductive pressure sensor will be described as follows. Generally, the touch module is composed of multiple plates in a stack form. When these stacked plates are pressed by the user, they undergo displacement because of the applied pressure. As a consequence, the distance or the height of the gap between adjacent plates is subjected to a change. The electrodes of the inductive pressure sensor detect the change of the distance or the height of the gap between adjacent plates and thus result in variations in the current intensity. According to the current intensity, the corresponding pressure signal is generated.

In the conventional touch module, inductive pressure sensors are usually positioned at the outer edges of the touch module. However, the most pressure-sensitive area of the touch module is the base plate that is located directly under the touch surface. When the pressure is applied on touch surface, the pressure is readily to be transmitted to the underlying base plate. However, since the region under the base plate is usually obstructed by other structures, it is difficult to install large-area inductive pressure sensors. As a result, it is difficult to effectively enhance the pressure sensitivity and simplify the overall structure.

SUMMARY OF THE INVENTION

For solving the drawbacks of the conventional technologies, the present invention provides a touch module. The touch module of the present invention includes a pressure sensor, and the pressure sensor is an inductive pressure sensor. The pressure sensor is installed on a base plate under a touch-sensitive area of a touch plate and is located within an elastic structure of the base plate. Since the elastic structure is extended from the base plate and contacted with the bottom side of the touch-sensitive area of the touch plate, the elastic structure on the base plate not only supports the touch plate but also efficiently transmits the pressure to the pressure sensor in real time. Consequently, the sensing sensitivity will be increased. Furthermore, the integration of the elastic structure and the pressure sensor also reduces the overall thickness of the touch module while simplifying the overall structure.

Furthermore, the touch module of the present invention can be equipped with multiple pressure sensors that work together for pressure detection. When the pressed position is near one of the pressure sensors, another pressure sensor will generate a different signal. During the signal processing process, the microprocessor analyzes the different signals produced by the various pressure sensors at different locations. After these signals are recognized and processed, the microprocessor can accurately detect the pressing action and correspondingly generates a pressure signal.

In accordance with an aspect of the present invention, a touch module is provided. The touch module includes a base plate, a touch plate, an elastic structure and a pressure sensor. The base plate has a top surface. The touch plate is located over the base plate and covers the base plate. A bottom surface of the touch plate and the top surface of the base plate are parallel to and aligned with each other. The elastic structure is disposed on the top surface of the base plate. The elastic structure includes an elastic element and a separation element. The separation element is disposed on the elastic element and contacted with the bottom surface of the touch plate. The pressure sensor is arranged between the base plate and the touch plate and aligned with the elastic element. The pressure sensor includes a sensing element and a sensing part. The sensing element is installed on the bottom surface of the touch plate and aligned with the elastic element. The sensing part is located beside the elastic element of the elastic structure. When the touch plate is pressed, the elastic element of the elastic structure is moved, and a distance between the sensing element and the sensing part is subjected to a change. Consequently, an electric signal is generated.

In an embodiment, the elastic element has a force-bearing surface and a peripheral surface. The force-bearing surface and the peripheral surface are formed on the top surface of the base plate and are parallel to the top surface of the base plate. The peripheral surface is arranged around the force-bearing surface. The force-bearing surface is movable relative to the peripheral surface of the elastic element and the top surface of the base plate. The separation element is disposed on the force-bearing surface of the elastic element. The separation element is contacted with the bottom surface of the touch plate.

In an embodiment, the sensing element of the pressure sensor is disposed on the bottom surface of the touch plate and aligned with the peripheral surface of the elastic element, and the sensing part of the pressure sensor is located in the peripheral surface of the elastic element.

In an embodiment, the sensing element of the pressure sensor has a sensing surface, the sensing surface of the sensing element is formed on the bottom surface of the touch plate and is parallel to the bottom surface of the touch plate, and the sensing surface is located over the elastic element of the elastic structure and aligned with the peripheral surface of the elastic element.

In an embodiment, the sensing part of the pressure sensor has a sensing range plane. The sensing range plane of the sensing part is formed on the top surface of the base plate and located in the peripheral surface of the elastic element. The sensing range plane is aligned with the sensing surface of the sensing element.

In an embodiment, an area of the sensing range plane of the sensing part corresponds to an area of the sensing surface of the sensing element.

In an embodiment, the elastic structure further includes a groove, and the groove is formed in the base plate. The groove is located beside the elastic element of the elastic structure and arranged between the sensing part of the pressure sensor of the pressure sensor and the elastic element of the elastic structure. The sensing part of the pressure sensor and the elastic element of the elastic structure are separated from each other by the groove.

In accordance with another aspect of the present invention, a touch module is provided. The touch module includes a base plate, a touch plate, an elastic structure, a first pressure sensor and a second pressure sensor. The base plate has a top surface. The touch plate is located over the base plate and covers the base plate. A bottom surface of the touch plate and the top surface of the base plate are parallel to and aligned with each other. The elastic structure is disposed on the top surface of the base plate. The elastic structure includes a first elastic element and a second elastic element. The first pressure sensor is arranged between the base plate and the touch plate and aligned with the first elastic element of the elastic structure. The first pressure sensor includes a first sensing element and a first sensing part. The first sensing element is installed on the bottom surface of the touch plate and aligned with the first elastic element. The first sensing part is located beside the first elastic element. The second pressure sensor is arranged between the base plate and the touch plate, separated from the first pressure sensor, aligned with the second elastic element of the elastic structure. The second pressure sensor includes a second sensing element and a second sensing part. The second sensing element is installed on the bottom surface of the touch plate and aligned with the second elastic element. The second sensing part is located beside the second elastic element. When the touch plate is pressed, the first elastic element and the second elastic element of the elastic structure are moved. A distance between the first sensing element and the first sensing part is subjected to a change, so that a first electric signal is generated. A distance between the second sensing element and the second sensing part is subjected to a change, so that a second electric signal is generated.

In an embodiment, when the touch plate is pressed and a pressed position of the touch plate is close to the first pressure sensor, the distance between the first sensing element and the first sensing part of the first pressure sensor is decreased, and the distance between the second sensing element and the second sensing part of the second pressure sensor is increased. Consequently, an intensity of the first electric signal is higher than an intensity of the second electric signal. When the pressed position of the touch plate is close to the second pressure sensor, the distance between the first sensing element and the first sensing part of the first pressure sensor is increased, and the distance between the second sensing element and the second sensing part of the second pressure sensor is decreased. Consequently, the intensity of the first electric signal is lower than the intensity of the second electric signal.

In an embodiment, the first elastic element includes a first separation element, and the second elastic element includes a second separation element. The first separation element is disposed on the first elastic element and contacted with the bottom surface of the touch plate. The second separation element is disposed on the second elastic element and contacted with the bottom surface of the touch plate.

In an embodiment, the first elastic element of the elastic structure has a first force-bearing surface and a first peripheral surface, and the second elastic element of the elastic structure has a second force-bearing surface and a second peripheral surface. The first force-bearing surface and the second force-bearing surface are formed on the top surface of the base plate and are parallel to the top surface of the base plate. The first force-bearing surface and the second force-bearing surface are movable relative to the top surface of the base plate. The first peripheral surface is located beside the first force-bearing surface. The second peripheral surface is located beside the second force-bearing surface. The first separation element is disposed on the first force-bearing surface. The second separation element is disposed on the second force-bearing surface.

In an embodiment, the first sensing element of the first pressure sensor has a first sensing surface, and the second sensing element of the second pressure sensor has a second sensing surface. The first sensing surface of the first sensing element is formed on the bottom surface of the touch plate and aligned with the first peripheral surface of the first elastic element. The second sensing surface of the second sensing element is formed on the bottom surface of the touch plate and aligned with the second peripheral surface of the second elastic element.

In an embodiment, the first sensing part of the first pressure sensor has a first sensing range plane, and the second sensing part of the second pressure sensor has a second sensing range plane. The first sensing range plane of the first sensing part is disposed on a periphery of the first elastic element and located in the first peripheral surface of the first elastic element. The first sensing range plane is aligned with the first sensing surface of the first sensing element. The second sensing range plane of the second sensing part is disposed on a periphery of the second elastic element and located in the second peripheral surface of the second elastic element. The second sensing range plane is aligned with the second sensing surface of the second sensing element.

In an embodiment, an area of the first sensing range plane of the first sensing part corresponds to an area of the first sensing surface of the first sensing element, and an area of the second sensing range plane of the second sensing part corresponds to an area of the second sensing surface of the second sensing element.

In an embodiment, the elastic structure further includes a first groove and a second groove, and the first groove and the second groove are formed in the base plate. The first groove is located in a periphery of the first elastic element. The first force-bearing surface and the first peripheral surface of the first elastic element are separated from each other by the first groove. The second groove is located in a periphery of the second elastic element. The second force-bearing surface and the second peripheral surface of the second elastic element are separated from each other by the second groove.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and accompanying drawings.

Figure 1:
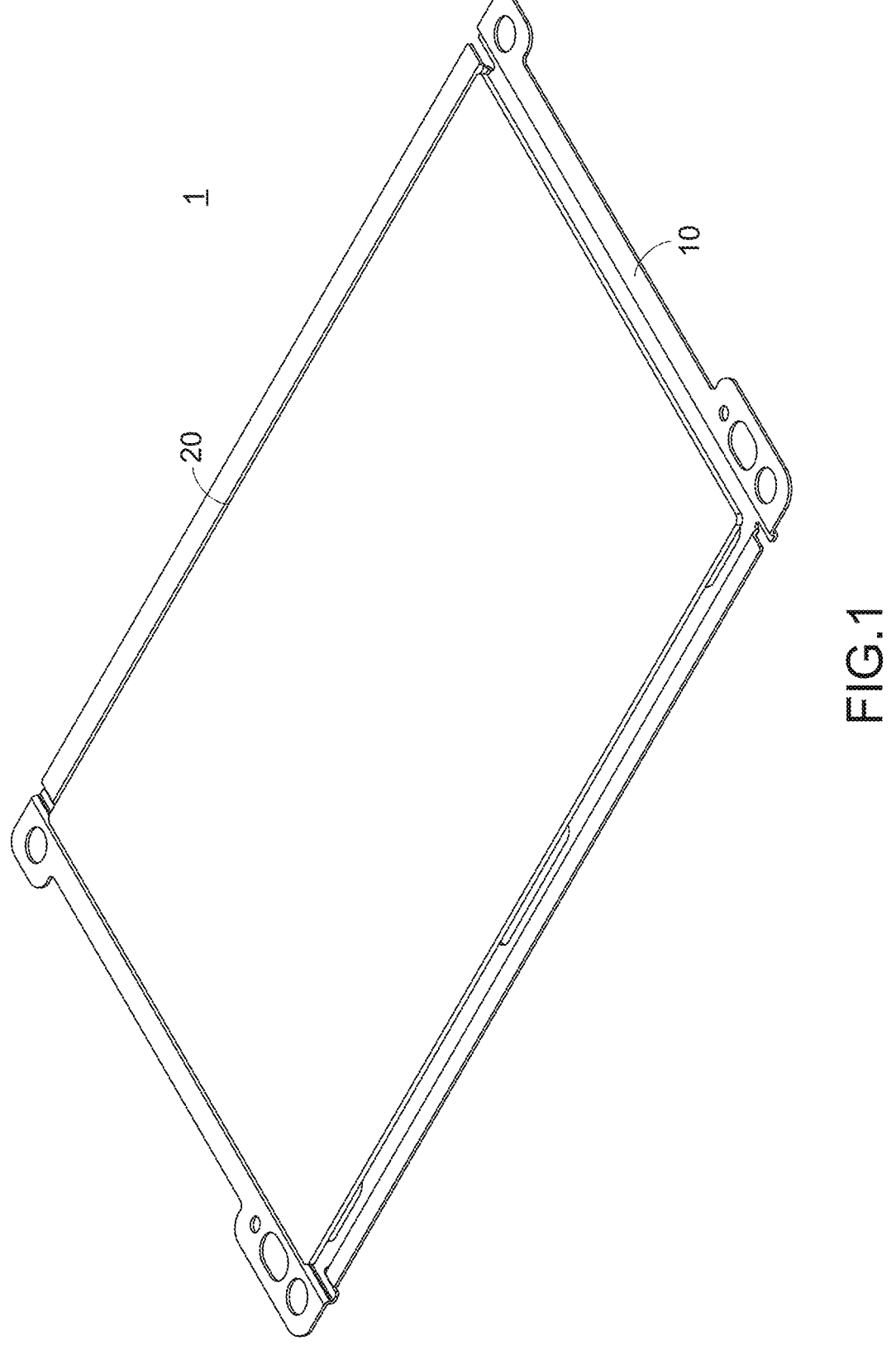
FIG. 1 is a schematic perspective view of a touch module according to a first embodiment of the present invention.
Figure 2:
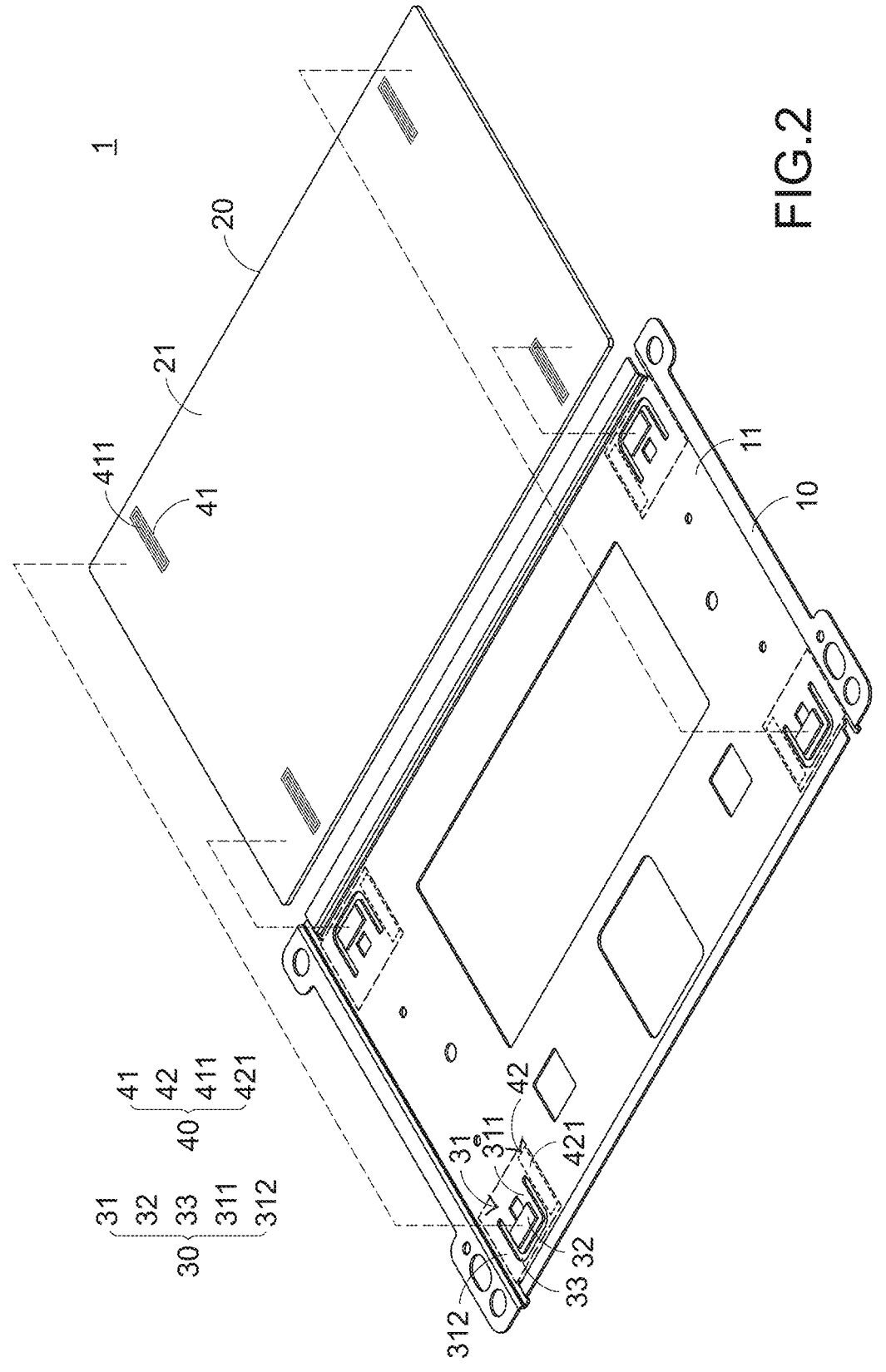
FIG. 2 is a schematic exploded view of the touch module according to the first embodiment of the present invention.

FIG. 1 is a schematic perspective view of a touch module according to a first embodiment of the present invention. FIG. 2 is a schematic exploded view of the touch module according to the first embodiment of the present invention.

In an embodiment, the touch module 1 includes a base plate 10, a touch plate 20, an elastic structure 30 and a pressure sensor 40. The base plate 10 has a top surface 11. The touch plate 20 has a bottom surface 21. The elastic structure 30 includes an elastic element 31, a separation element 32 and a groove 33. The elastic element 31 has a force-bearing surface 311 and a peripheral surface 312. The pressure sensor 40 includes a sensing element 41 and a sensing part 42. The sensing element 41 has a sensing surface 411. The sensing part 42 has a sensing range plane 421.

Figure 4:
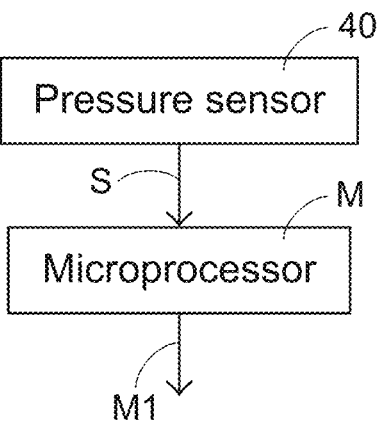
FIG. 4 schematically illustrates a signal processing flow of the touch module according to the first embodiment of the present invention.

The touch module 1 further includes a microprocessor M (shown in FIG. 4). The microprocessor M is disposed within the touch module 1 or disposed within an external electronic product (not shown) where the touch module 1 is connected.

The touch plate 20 is located over the base plate 10 to cover the base plate 10. The bottom surface 21 of the touch plate 20 and the top surface 11 of the base plate 10 are parallel to each other and aligned with each other. The elastic structure 30 is disposed on the top surface 11 of the base plate 10. The elastic element 31 of the elastic structure 30 is disposed on the top surface 11 of the base plate 10. The force-bearing surface 311 and the peripheral surface 312 of the elastic element 31 are formed on the top surface 11 of the base plate 10 and are parallel to the top surface 11 of the base plate 10. The peripheral surface 312 is arranged around the periphery of the force-bearing surface 311. The force-bearing surface 311 of the elastic element 31 is movable relative to the top surface 11 of the base plate 10 and the peripheral surface 312 of the elastic element 31. The peripheral surface 312 of the elastic element 31 is not movable relative to the top surface 11 of the base plate 10. When the force bearing surface 311 is not moved, the force bearing surface 311 and the peripheral surface 312 are coplanar with the top surface 11 of the base plate 10.

In the elastic structure 30, the separation element 32 is disposed on the force-bearing surface 311 of the elastic element 31. In addition, the separation element 32 is contacted with and abuts against the bottom surface 21 of the touch plate 20. The groove 33 of the elastic structure 30 is formed in the base plate 10. In addition, the groove 33 is located beside the elastic element 31. Preferably, the force-bearing surface 311 and the peripheral surface 312 of the elastic element 31 are separated from each other by the groove 33. For example, by punching or cutting the top surface 11 of the base plate 10 to form a hollow groove 33, the elastic element 31 is produced. Consequently, the periphery of the elastic element 31 is surrounded by the groove 33.

The pressure sensor 40 is arranged between the base plate 10 and the touch plate 20. The sensing element 41 of the pressure sensor 40 is coupled to the bottom surface 21 of the touch plate 20 and aligned with the elastic element 31. In this embodiment, the sensing element 41 is aligned with the peripheral surface 312 of the elastic element 31. The sensing part 42 of the pressure sensor 40 and the elastic element 31 of the elastic structure 30 are located beside each other. Preferably, the sensing part 42 is installed on the periphery of the elastic element 31 of the elastic structure 30 and is located in the peripheral surface 312 of the elastic element 31. Furthermore, the groove 33 is arranged between the sensing part 42 of the pressure sensor 40 and the elastic element 31 of the elastic structure 30. The sensing part 42 of the pressure sensor 40 and the elastic element 31 of the elastic structure 30 are separated from each other by the groove 33. Consequently, the sensing range plane 421 of the sensing part 42 and the force-bearing surface 311 of the elastic element 31 are separated from each other by the groove 33.

Furthermore, the sensing element 41 of the pressure sensor 40 is preferably embedded in or tightly attached on the bottom surface 21 of the touch plate 20. The sensing surface 411 of the sensing element 41 is formed on the bottom surface 21 of the touch plate 20 and is parallel to the bottom surface 21 of the touch plate 20. Furthermore, the sensing surface 411 covers the top side of the elastic element 31 of the elastic structure 30, and the sensing surface 411 is aligned with the peripheral surface 312 of the elastic element 31. The sensing range plane 421 of the sensing part 42 of the pressure sensor 40 is formed on the top surface 11 of the base plate 10 and is located in the peripheral surface 312 of the elastic element 31. The sensing range plane 421 is aligned with the sensing surface 411 of the sensing element 41. Preferably, the sensing surface 411 of the sensing element 41 covers the top side of the sensing range plane 421 of the sensing part 42. In addition, the area of the sensing range plane 421 of the sensing part 42 corresponds to the area of the sensing surface 411 of the sensing element 41. When the elastic element 31 is moved in response to the applied pressure, the sensing surface 411 of the sensing element 41 on the base plate 10 can be immediately driven to approach the sensing range plane 421 of the sensing part 42 on the touch plate 20. In addition, the change of the distance between the sensing surface 411 and the sensing range plane 421 can be sensed.

The sensing element 41 and the sensing part 42 of the pressure sensor 40 are inductive elements. The sensing element 41 is an induction coil. The induction coil is arranged to surround a portion of the bottom surface 21 of the touch plate 20 to form the sensing surface 411 of the sensing element 41. Furthermore, electricity can be provided to the sensing element 41 through the touch plate 20. After electricity is provided to the sensing element 41, the sensing element 41 has an induction effect. Furthermore, the region of the bottom surface 21 of the touch plate 20 that is contacted with the separation element 32 is not provided with the sensing element 41. That is, the sensing surface 411 is not formed in this region. Since the induction coil in the sensing surface 411 is not pressed by the separation element 32, the induction coil will not be subjected to deformation. The sensing part 42 is made of an inductive material, preferably a metallic material. In accordance with the present invention, the base plate 10 is made of a metallic material. The sensing part 42 is formed on the top surface 11 of the base plate 10. In other words, the sensing range plane 421 of the sensing part 42 is a partial area of the top surface 11 of the base plate 10, and the sensing part 42 is also made of the metallic material. Due to this arrangement, the sensing element 41 and the sensing part 42 of the pressure sensor 40 to sense each other.

The pressure sensing method of the sensing element 41 and the sensing part 42 of the pressure sensor 40 will be described as follows.

Figure 3A:
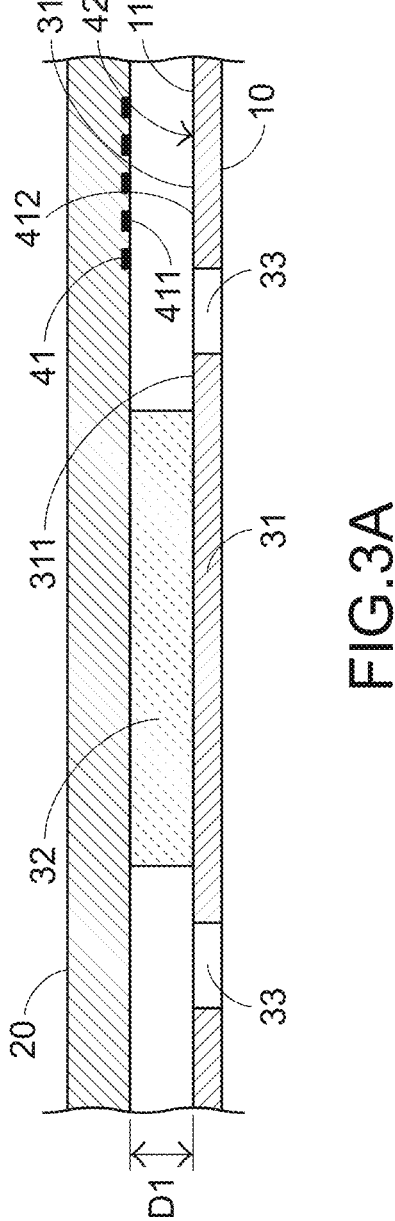
FIG. 3A is a schematic cross-sectional diagram of the touch module according to the first embodiment of the present invention, in which the touch plate is not pressed.
Figure 3B:
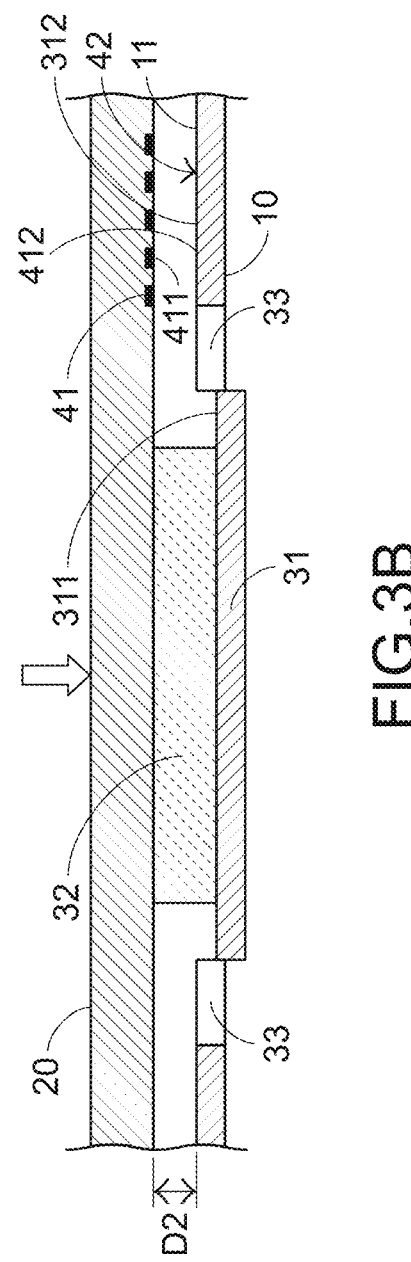
FIG. 3B is a schematic cross-sectional diagram of the touch module according to the first embodiment of the present invention, in which the touch plate is pressed.

FIG. 3A is a schematic cross-sectional diagram of the touch module according to the first embodiment of the present invention, in which the touch plate is not pressed. FIG. 3B is a schematic cross-sectional diagram of the touch module according to the first embodiment of the present invention, in which the touch plate is pressed. FIG. 4 schematically illustrates a signal processing flow of the touch module according to the first embodiment of the present invention.

In FIG. 3A, the touch plate 20 is in an unpressed state. When the touch plate 20 is not pressed, the separation element 32 on the force-bearing surface 311 of the elastic element 31 abuts against the touch plate 20, and thus the touch plate 20 is separated from the bottom surface 11 of the base plate 10. Meanwhile, the sensing surface 411 of the sensing element 41 on the touch plate 20 and the sensing range plane 421 of the sensing part 42 on the top surface 11 of the base plate 10 are separated from each other by a first distance D1.

In FIG. 3B, the touch plate 20 is in a pressed state. When the touch plate 20 is pressed, the touch plate 20 is moved toward the top surface 11 of the base plate 10. Since the separation element 32 abuts against the touch plate 20, the separation element 32 is pushed downwardly in response to the displacement of the pressed touch plate 20. The pressure is transmitted to the force-bearing surface 311 of the elastic element 31 through the separation element 32. In response to the pressure on the force-bearing surface 311, the elastic element 31 is moved in the direction away from the top surface 11 of the base plate 10. Meanwhile, the distance between the sensing surface 411 of the sensing element 41 and the sensing range plane 421 of the sensing part 42 is decreased to a second distance D2.

As mentioned above, in case that the distance between the sensing element 41 and the sensing part 42 of the pressure sensor 40 is larger, the current intensity is smaller. Whereas, in case that the distance between the sensing element 41 and the sensing part 42 of the pressure sensor 40 is smaller, the current intensity is larger.

The signal processing flow of the touch module will be described with reference to FIG. 4. When the touch plate 20 is pressed, the distance between the sensing surface 411 of the sensing element 41 and the sensing range plane 421 of the sensing part 42 is decreased from the first distance D1 to the second distance D2. The current intensity between the sensing element 41 and the sensing part 42 is subjected to a change. Consequently, the current intensity generated by the pressure sensor 40 increases. Meanwhile, an electric signal S is generated and issued to the microprocessor M. After receiving the electric signal S, the microprocessor M generates a pressure signal M1.

A second embodiment of the touch module will be described as follows.

Figure 5:
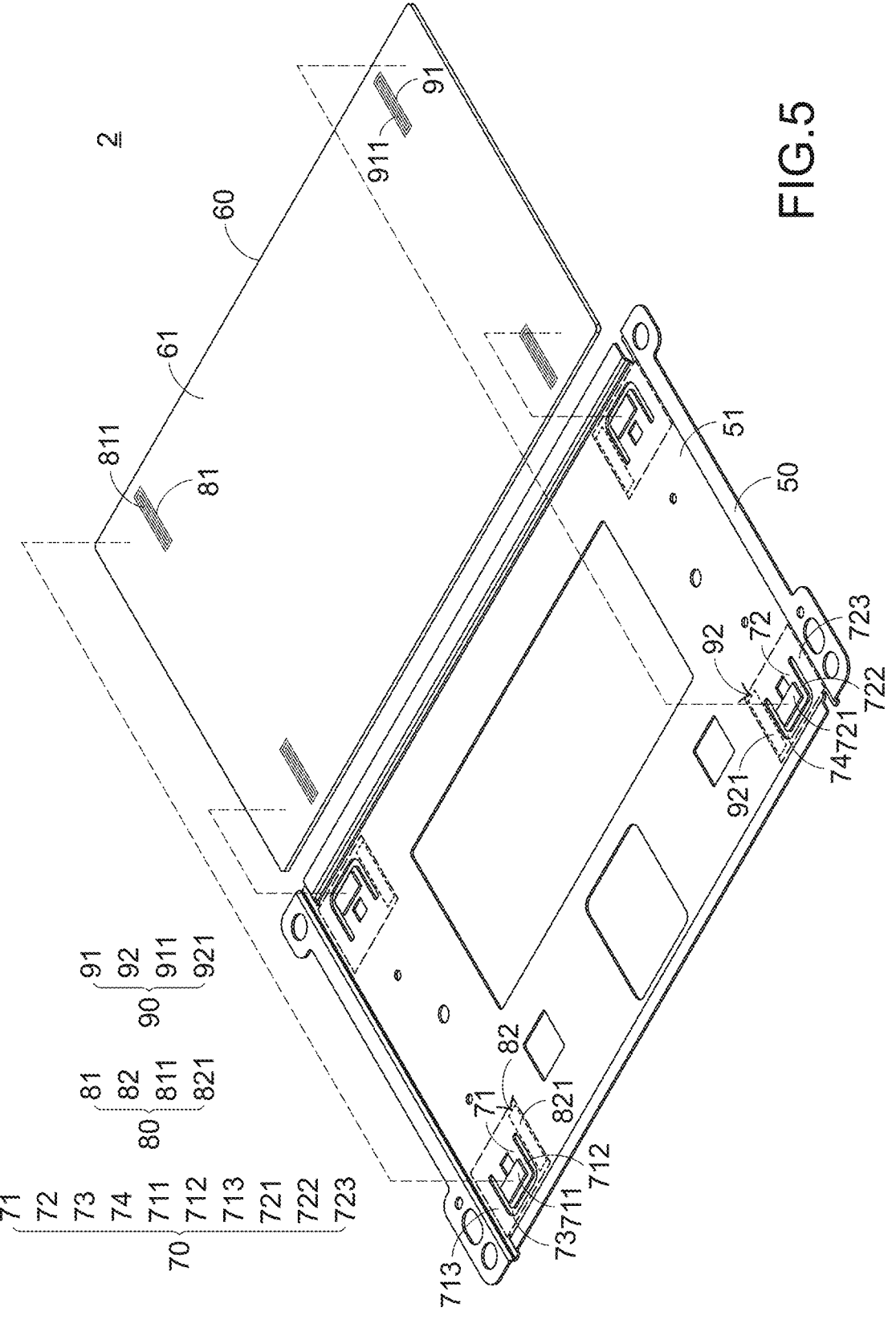
FIG. 5 is a schematic exploded view of a touch module according to a second embodiment of the present invention.
Figure 6A:
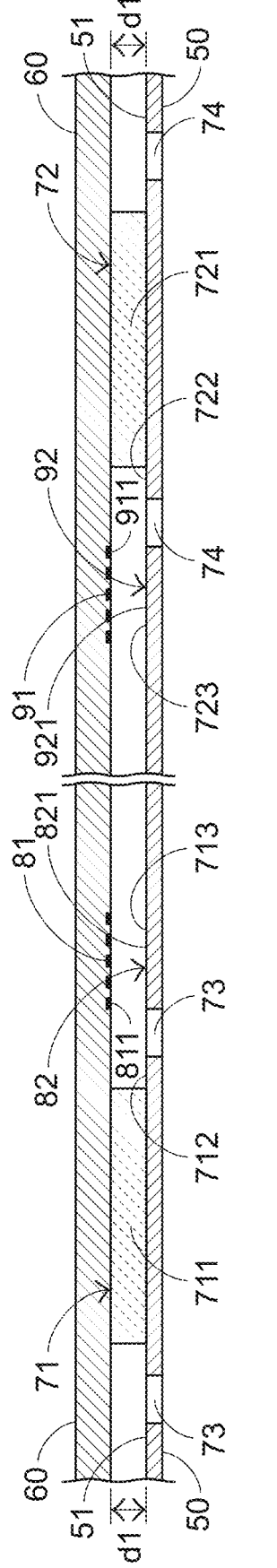
FIG. 6A is a schematic cross-sectional diagram of the touch module according to the second embodiment of the present invention, in which the touch plate is not pressed.
Figure 6B:
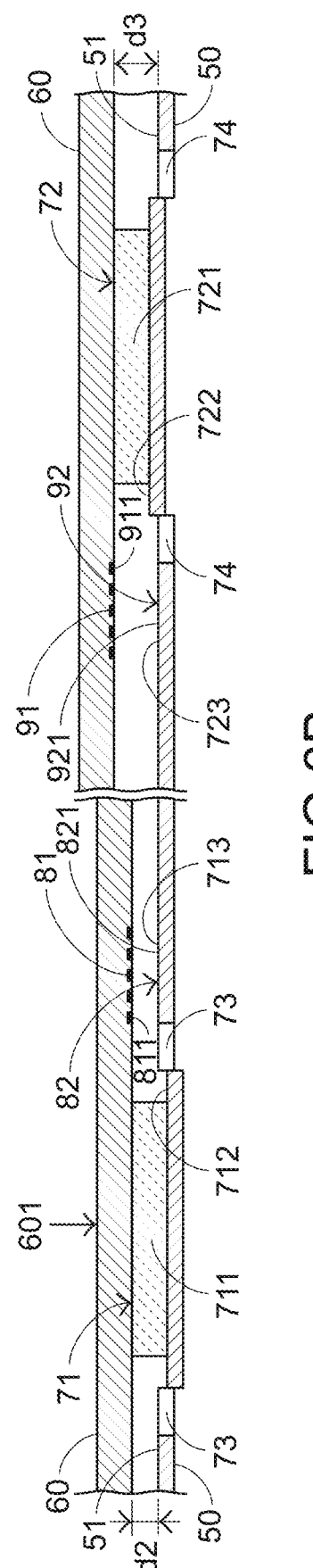
FIG. 6B is a schematic cross-sectional diagram of the touch module according to the second embodiment of the present invention, in which the touch plate is pressed.
Figure 7:
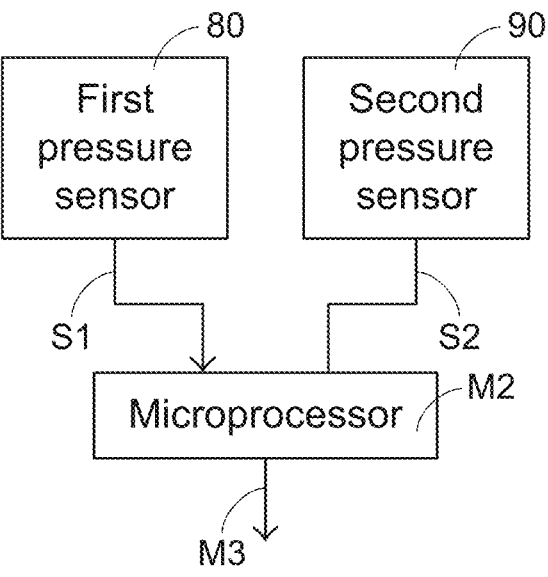
FIG. 7 schematically illustrates a signal processing flow of the touch module according to the second embodiment of the present invention.

FIG. 5 is a schematic exploded view of a touch module according to a second embodiment of the present invention. FIG. 6A is a schematic cross-sectional diagram of the touch module according to the second embodiment of the present invention, in which the touch plate is not pressed. FIG. 6B is a schematic cross-sectional diagram of the touch module according to the second embodiment of the present invention, in which the touch plate is pressed. FIG. 7 schematically illustrates a signal processing flow of the touch module according to the second embodiment of the present invention.

In this embodiment, the touch module 2 includes a base plate 50, a touch plate 60, an elastic structure 70, a first pressure sensor 80 and a second pressure sensor 90. The base plate 50 has a top surface 51. The touch plate 60 has a bottom surface 61. The elastic structure 70 includes a first elastic element 71, a second elastic element 72, a first groove 73 and a second groove 74. The first elastic element 71 of the elastic structure 70 includes a first separation element 711, a first force-bearing surface 712 and a first peripheral surface 713. The second elastic element 72 includes a second separation element 721, a second force-bearing surface 722 and a second peripheral surface 723. The first pressure sensor 80 includes a first sensing element 81 and a first sensing part 82. The first sensing element 81 has a first sensing surface 811. The first sensing part 82 has a first sensing range plane 821. The second pressure sensor 90 includes a second sensing element 91 and a second sensing part 92. The second sensing element 91 has a second sensing surface 911. The second sensing part 92 has a second sensing range plane 921.

The touch plate 60 is located over the base plate 50 to cover the base plate 50. The bottom surface 61 of the touch plate 60 and the top surface 51 of the base plate 50 are parallel to each other and aligned with each other. The elastic structure 70 is disposed on the top surface 51 of the base plate 50. The first pressure sensor 80 and the second pressure sensor 90 are arranged between the base plate 50 and the touch plate 60. In addition, the first pressure sensor 80 and the second pressure sensor 90 are separated from each other.

The first force-bearing surface 712 of the first elastic element 71 of the elastic structure 70 and the second force-bearing surface 722 of the second elastic element 72 are formed on the top surface 51 of the base plate 50 and are parallel to the top surface 51 of the base plate 50. The first force-bearing surface 712 and the second force-bearing surface 722 are movable relative to the top surface 51 of the base plate 50. The first peripheral surface 713 of the first elastic element 71 is located beside the first force-bearing surface 712 of the first elastic element 71. The second peripheral surface 723 of the second elastic element 72 is located beside the second force-bearing surface 722 of the second elastic element 72. The first separation element 711 of the first elastic element 71 is disposed on the first force-bearing surface 712 of the first elastic element 71. In addition, the first separation element 711 of the first elastic element 71 is contacted with the bottom surface 61 of the touch plate 60. Preferably, the first separation element 711 is coupled to the bottom surface 61 of the touch plate 60. The second separation element 721 of the second elastic element 72 is disposed on the second force-bearing surface 722 of the second elastic element 72. In addition, the second separation element 721 of the second elastic element 72 is contacted with the bottom surface 61 of the touch plate 60. Preferably, the second separation element 721 is coupled to the bottom surface 61 of the touch plate 60.

The first pressure sensor 80 is aligned with the first elastic element 71 of the elastic structure 70. The first sensing element 81 of the first pressure sensor 80 is disposed on the bottom surface 61 of the touch plate 60. In addition, the first sensing element 81 is aligned with the first elastic element 71. The first sensing part 82 of the first pressure sensor 80 is disposed on the periphery of the first elastic element 71. In addition, the first sensing part 82 of the first pressure sensor 80 is located beside the first force-bearing surface 712 of the first elastic element 71. The second sensing element 91 of the second pressure sensor 90 is disposed on the bottom surface 61 of the touch plate 60. In addition, the second sensing element 91 of the second pressure sensor 90 is aligned with the second elastic element 72. The second sensing part 92 of the second pressure sensor 90 is disposed on the periphery of the second elastic element 72. In addition, the second sensing part 92 of the second pressure sensor 90 is located beside the second force-bearing surface 722 of the second elastic element 72.

In an embodiment, the first sensing surface 811 of the first sensing element 81 of the first pressure sensor 80 is disposed on the bottom surface 61 of the touch plate 60, and the first sensing surface 811 is parallel to the bottom surface 61 of the touch plate 60. Furthermore, the first sensing surface 811 of the first sensing element 81 covers the first peripheral surface 713 of the first elastic element 71. The first sensing range plane 821 of the first sensing part 82 of the first pressure sensor 80 is disposed on the periphery of the first elastic element 71. Preferably, the first sensing range plane 821 is located in the first peripheral surface 713 of the first elastic element 71. In addition, the first sensing range plane 821 is aligned with the first sensing surface 811 of the first sensing element 81.

In an embodiment, the second sensing surface 911 of the second sensing element 91 of the second pressure sensor 90 is disposed on the bottom surface 61 of the touch plate 60, and the second sensing surface 911 is parallel to the bottom surface 61 of the touch plate 60. Furthermore, the second sensing surface 911 covers the second peripheral surface 723 of the second elastic element 72. The second sensing range plane 921 of the second sensing part 92 of the second pressure sensor 90 is disposed on the periphery of the second elastic element 72. Preferably, the second sensing range plane 921 is located in the second peripheral surface 723 of the second elastic element 72. In addition, the second sensing range plane 921 is aligned with the second sensing surface 911 of the second sensing element 91.

Furthermore, the area of the sensing range plane 821 of the first sensing part 82 corresponds to the area of the first sensing surface 811 of the first sensing element 81, and the area of the second sensing range plane 921 of the second sensing part 92 corresponds to the area of the second sensing surface 911 of the second sensing element 91. Since the corresponding areas match each other, the induction effect is enhanced.

The first groove 73 and the second groove 74 of the elastic structure 70 are formed in the base plate 50. The first groove 73 is located in the periphery of the first elastic element 71 of the elastic structure 70. In addition, the first force-bearing surface 712 and the first peripheral surface 713 of the first elastic element 71 are separated from each other by the first groove 73. Since the first force-bearing surface 712 is separated from the first peripheral surface 713 by the first groove 73, the first force-bearing surface 712 is movable more easily than the first peripheral surface 713. The second groove 74 is located in the periphery of the second elastic element 72 of the elastic structure 70. In addition, the second force-bearing surface 722 and the second peripheral surface 723 of the second elastic element 72 are separated from each other by the second groove 74. Since the second force-bearing surface 722 is separated from the second peripheral surface 723 by the second groove 74, the second force-bearing surface 722 is movable more easily than the second peripheral surface 723.

Preferably, by forming the hollow first groove 73 and the hollow second groove 74, the first elastic element 71 and the second elastic element 72 are produced. Furthermore, the periphery of the first elastic element 71 is surrounded by the first groove 73, and the periphery of the second elastic element 72 is surrounded by the second groove 74. Consequently, the first elastic element 71 and the second elastic element 72 have higher mobility and elasticity relative to the base plate 60, and the first elastic element 71 and the second elastic element 72 are readily subjected to deformation in response to the touch pressure. In addition, the first pressure sensor 80 and the second pressure sensor 90 can detect the changes of the displacement and the distance between the base plate 50 and the touch plate 60 more sensitively.

The pressure sensing method of the touch module of the second embodiment will be described with reference to FIG. 6A, FIG. 6B and FIG. 7.

FIG. 6A is a schematic cross-sectional diagram of the touch module according to the second embodiment of the present invention, in which the touch plate is not pressed. FIG. 6B is a schematic cross-sectional diagram of the touch module according to the second embodiment of the present invention, in which the touch plate is pressed. FIG. 7 schematically illustrates a signal processing flow of the touch module according to the second embodiment of the present invention.

In FIG. 6A, the touch plate 60 is in an unpressed state. When the touch plate 60 is not pressed, the first separation element 711 on the force-bearing surface 712 of the first elastic element 71 abuts against the touch plate 60, and the separation element 721 on the force-bearing surface 722 of the second elastic element 72 abuts against the touch plate 60. Consequently, the touch plate 60 and the top surface 51 of the base plate 50 are separated from each other. Furthermore, the first sensing surface 811 of the first sensing element 81 of the first pressure sensor 80 and the first sensing range plane 821 of the first sensing part 82 are separated from each other by a basic distance d1, and the second sensing surface 911 of the second sensing element 91 of the second pressure sensor 90 and the second sensing range plane 921 of the second sensing part 92 are separated from each other by the basic distance d1.

In FIG. 6B, the touch plate 60 is in a pressed state. When the touch plate 60 is pressed, the first elastic element 71 and the second elastic element 72 of the elastic structure 70 are moved. The distance between the first sensing surface 811 of the first sensing element 81 of the first pressure sensor 80 and the first sensing range plane 821 of the first sensing part 82 is changed. For example, the basic distance d1 is decreased to a first trigger distance d2. Consequently, as shown in FIG. 7, a first electric signal S1 is generated. At the same time, the distance between the second sensing surface 911 of the second sensing element 91 of the second pressure sensor 90 and the second sensing range plane 921 of the second sensing part 92 is changed, and the distance is increased to a second trigger distance d3. Consequently, as shown in FIG. 7, a second electric signal S2 is generated. In this embodiment, the distance change between the first sensing element 81 and the first sensing part 82 and the distance change between the second sensing element 91 and the second sensing part 92 are different. According to the distance change difference, the microprocessor M judges whether the first pressure sensor 80 or the second pressure sensor 90 is pressed.

For example, a pressed position 601 on the touch plate 60 is pressed by the user. For illustration, the pressed position 601 is close to the first pressure sensor 80.

Since the pressed position 601 is close to the first pressure sensor 80, the distance between the first sensing element 81 and the first sensing part 82 of the first pressure sensor 80 becomes shorter. However, due to the overall rigidity of the touch plate 60, the touch plate 60 will be tilted toward the pressed position 601 after being pressed. Correspondingly, the position of the second pressure sensor 90 is far away from the pressed position 601. After the touch plate 60 is tilted, the distance between the second sensing element 91 and the second sensing part 92 of the second pressure sensor 90 will become longer. According to the principles of the inductive pressure sensor, the distance between the sensing element and the second sensing part is related to the intensity of the generated current. If the distance between the sensing element and the second sensing part is larger, the intensity of the generated current is smaller. Whereas, if the distance between the sensing element and the second sensing part is smaller, the intensity of the generated current is larger. In other words, the current intensity of the first electric signal S1 generated by the first pressure sensor 80 is greater than the current intensity of the second electric signal S2 generated by the second pressure sensor 90.

Similarly, if the pressed position 601 is close to the second pressure sensor 90, the distance between the first sensing element 81 and the first sensing part 82 of the first pressure sensor 80 becomes longer, and the distance between the second sensing element 91 and the second sensing part 92 of the second pressure sensor 90 becomes shorter. Consequently, the current intensity of the first electric signal S1 lower than the current intensity of the second electric signal S2.

Please refer to FIG. 6A, FIG. 6B and FIG. 7 again. When the touch plate 60 is pressed and the pressed position 601 is close to the first pressure sensor 80, the pressed position 601 is also close to the first elastic element 71. In response to the pressing force, the first force-bearing surface 712 of the first elastic element 71 is pushed by the first separation element 711 of the elastic structure 70. Consequently, the first elastic element 71 is moved downwardly, and the distance between the first sensing surface 811 of the first sensing element 81 of the first pressure sensor 80 and the first sensing range plane 821 of the first sensing part 82 is decreased from the basic distance d1 to the first trigger distance d2. Meanwhile, the first pressure sensor 80 generates the first electric signal S1. However, due to the rigidity of the touch pad 60, the region of the touch pad 60 away from the pressed position 601 is lifted up. Correspondingly, the second force-bearing surface 722 is pulled by the second separation element 721 of the second elastic element 72 away from the pressed position 601. Consequently, the second force-bearing surface 722 is moved upwardly, and the distance between the second sensing surface 911 of the second sensing element 91 of the second pressure sensor 90 and the second sensing range plane 921 of the second sensing part 92 is increased from the basic distance d1 to the second trigger distance d3. Meanwhile, the second pressure sensor 90 generates the second electric signal S2. Since the first trigger distance d2 is smaller than the second trigger distance d3, the current intensity of the first electric signal S1 generated by the first pressure sensor 80 will be greater than the current intensity of the second electric signal S2 generated by the second pressure sensor 90.

After receiving the first electric signal S1 from the first pressure sensor 80 and the second electrical signal S2 from the second pressure sensor 90, the microprocessor M2 compares the current intensity of the first electric signal S1 from the first pressure sensor 80 with the second electric signal S2 from the second pressure sensor 90. After the microprocessor M2 confirms that the current intensity of the first electric signal S1 is higher than the current intensity of the second electric signal S2 and the current intensity of the first electric signal S1 and the current intensity of the second electric signal S2 are different, the microprocessor M2 generates a pressure signal M3.

In another situation, the pressed position 601 is close to the second pressure sensor 90. After the microprocessor M2 confirms that the current intensity of the first electric signal S1 is lower than the current intensity of the second electric signal S2, the microprocessor M2 also generates the pressure signal M3.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touch module, comprising:
a base plate having a top surface;
a touch plate located over the base plate and covering the base plate, wherein a bottom surface of the touch plate and the top surface of the base plate are parallel to and aligned with each other;
an elastic structure disposed on the top surface of the base plate, and comprising an elastic element and a separation element, wherein the separation element is disposed on the elastic element and contacted with the bottom surface of the touch plate; and
a pressure sensor arranged between the base plate and the touch plate, aligned with the elastic element, and comprising a sensing element and a sensing part, wherein the sensing element is installed on the bottom surface of the touch plate and aligned with the elastic element, and the sensing part is located beside the elastic element of the elastic structure,
wherein when the touch plate is pressed, the elastic element of the elastic structure is moved, and a distance between the sensing element and the sensing part is subjected to a change, so that an electric signal is generated,
wherein the elastic element has a force-bearing surface and a peripheral surface, wherein the force-bearing surface and the peripheral surface are formed on the top surface of the base plate and are parallel to the top surface of the base plate, the peripheral surface is arranged around the force-bearing surface, the force-bearing surface is movable relative to the peripheral surface of the elastic element and the top surface of the base plate, the separation element is disposed on the force-bearing surface of the elastic element, and the separation element is contacted with the bottom surface of the touch plate.

2. The touch module according to claim 1, wherein the sensing element of the pressure sensor is disposed on the bottom surface of the touch plate and aligned with the peripheral surface of the elastic element, and the sensing part of the pressure sensor is located in the peripheral surface of the elastic element.

3. The touch module according to claim 1, wherein the sensing element of the pressure sensor has a sensing surface, the sensing surface of the sensing element is formed on the bottom surface of the touch plate and is parallel to the bottom surface of the touch plate, and the sensing surface is located over the elastic element of the elastic structure and aligned with the peripheral surface of the elastic element.

4. The touch module according to claim 3, wherein the sensing part of the pressure sensor has a sensing range plane, wherein the sensing range plane of the sensing part is formed on the top surface of the base plate and located in the peripheral surface of the elastic element, and the sensing range plane is aligned with the sensing surface of the sensing element.

5. The touch module according to claim 4, wherein an area of the sensing range plane of the sensing part corresponds to an area of the sensing surface of the sensing element.

6. The touch module according to claim 1, wherein the elastic structure further comprises a groove, and the groove is formed in the base plate, wherein the groove is located beside the elastic element of the elastic structure and arranged between the sensing part of the pressure sensor of the pressure sensor and the elastic element of the elastic structure, and the sensing part of the pressure sensor and the elastic element of the elastic structure are separated from each other by the groove.

7. A touch module, comprising:

a base plate having a top surface;

a touch plate located over the base plate and covering the base plate, wherein a bottom surface of the touch plate and the top surface of the base plate are parallel to and aligned with each other;

an elastic structure disposed on the top surface of the base plate, and comprising a first elastic element and a second elastic element;

a first pressure sensor arranged between the base plate and the touch plate, aligned with the first elastic element of the elastic structure, and comprising a first sensing element and a first sensing part, wherein the first sensing element is installed on the bottom surface of the touch plate and aligned with the first elastic element, and the first sensing part is located beside the first elastic element; and a second pressure sensor arranged between the base plate and the touch plate, separated from the first pressure sensor, aligned with the second elastic element of the elastic structure, and comprising a second sensing element and a second sensing part, wherein the second sensing element is installed on the bottom surface of the touch plate and aligned with the second elastic element, and the second sensing part is located beside the second elastic element, wherein when the touch plate is pressed, the first elastic element and the second elastic element of the elastic structure are moved, a distance between the first sensing element and the first sensing part is subjected to a change, and a distance between the second sensing element and the second sensing part is subjected to a change, so that a first electric signal and a second electric signal are generated, wherein when the touch plate is pressed and a pressed position of the touch plate is close to the first pressure sensor, the distance between the first sensing element and the first sensing part of the first pressure sensor is decreased, and the distance between the second sensing element and the second sensing part of the second pressure sensor is increased, so that an intensity of the first electric signal is higher than an intensity of the second electric signal, wherein when the pressed position of the touch plate is close to the second pressure sensor, the distance between the first sensing element and the first sensing part of the first pressure sensor is increased, and the distance between the second sensing element and the second sensing part of the second pressure sensor is decreased, so that the intensity of the first electric signal is lower than the intensity of the second electric signal.

8. The touch module according to claim 7, wherein the first elastic element comprises a first separation element, and the second elastic element comprises a second separation element, wherein the first separation element is disposed on the first elastic element and contacted with the bottom surface of the touch plate, and the second separation element is disposed on the second elastic element and contacted with the bottom surface of the touch plate.

9. The touch module according to claim 8, wherein the first elastic element of the elastic structure has a first force-bearing surface and a first peripheral surface, and the second elastic element of the elastic structure has a second force-bearing surface and a second peripheral surface, wherein the first force-bearing surface and the second force-bearing surface are formed on the top surface of the base plate and are parallel to the top surface of the base plate, the first force-bearing surface and the second force-bearing surface are movable relative to the top surface of the base plate, the first peripheral surface is located beside the first force-bearing surface, the second peripheral surface is located beside the second force-bearing surface, the first separation element is disposed on the first force-bearing surface, and the second separation element is disposed on the second force-bearing surface.

10. The touch module according to claim 9, wherein the first sensing element of the first pressure sensor has a first sensing surface, and the second sensing element of the second pressure sensor has a second sensing surface, wherein the first sensing surface of the first sensing element is formed on the bottom surface of the touch plate and aligned with the first peripheral surface of the first elastic element, and the second sensing surface of the second sensing element is formed on the bottom surface of the touch plate and aligned with the second peripheral surface of the second elastic element.

11. The touch module according to claim 10, wherein the first sensing part of the first pressure sensor has a first sensing range plane, and the second sensing part of the second pressure sensor has a second sensing range plane, wherein the first sensing range plane of the first sensing part is disposed on a periphery of the first elastic element and located in the first peripheral surface of the first elastic element, the first sensing range plane is aligned with the first sensing surface of the first sensing element, the second sensing range plane of the second sensing part is disposed on a periphery of the second elastic element and located in the second peripheral surface of the second elastic element, and the second sensing range plane is aligned with the second sensing surface of the second sensing element.

12. The touch module according to claim 11, wherein an area of the first sensing range plane of the first sensing part corresponds to an area of the first sensing surface of the first sensing element, and an area of the second sensing range plane of the second sensing part corresponds to an area of the second sensing surface of the second sensing element.

13. The touch module according to claim 9, wherein the elastic structure further comprises a first groove and a second groove, and the first groove and the second groove are formed in the base plate, wherein the first groove is located in a periphery of the first elastic element, the first force-bearing surface and the first peripheral surface of the first elastic element are separated from each other by the first groove, the second groove is located in a periphery of the second elastic element, the second force-bearing surface and the second peripheral surface of the second elastic element are separated from each other by the second groove.

\* \* \* \* \*